United States Patent [19]

Gutwillinger

[11] Patent Number: 5,691,613
[45] Date of Patent: Nov. 25, 1997

[54] METHOD FOR DETERMINING A ROTOR POSITION OF A ROTARY MOTOR OR LINEAR MOTOR, AND CIRCUIT ARRANGEMENT FOR CARRYING OUT THE METHOD

[75] Inventor: Peter Gutwillinger, Vienna, Austria

[73] Assignee: LST Laser & Strahl Technik Herstellungs- und Handelsgesellschaft m.b.H., Vienna, Austria

[21] Appl. No.: 652,675

[22] Filed: May 28, 1996

[30] Foreign Application Priority Data

May 30, 1995 [AT] Austria ........................................ 909/95

[51] Int. Cl.[6] ................................................. H02P 6/18
[52] U.S. Cl. .......................... 318/500; 318/439; 318/721; 318/723
[58] Field of Search ............................. 318/138, 254, 318/439, 459, 500, 685, 696, 721, 723, 724

[56] References Cited

U.S. PATENT DOCUMENTS 3,750,000  7/1973  Bruckner et al. ........................ 318/685
4,763,058  8/1988  Heining et al. ........................ 318/807
5,559,419  9/1996  Jansen et al. ........................ 318/808

Primary Examiner—Bentsu Ro
Attorney, Agent, or Firm—Henry M. Feiereisen

[57] ABSTRACT

A method and circuit arrangement for controlling the position of a rotor of a rotary motor or a linear motor, e.g. a stepper motor, synchronous motor or the like, has at least two stator windings and a rotor with salient poles, wherein an actual value of the rotor position, e.g. the angle of rotation or the displacement of the rotor, is determined and compared to a desired value of the rotor position, with the exciting current that flows through the stator windings to move the rotor being modified in dependence on a determination of the inductance of the stator winding. The inductance is determined by superimposing the exciting current with a periodic measuring current that has a higher frequency than the operating frequency of the motor so as to prevent the measuring current from influencing the excitation of the stator winding, and by measuring the reactive voltage drop caused by the measuring current across the stator winding. Based on the measured voltage drop the inductance can be determined to provide information about the actual rotor position.

7 Claims, 1 Drawing Sheet

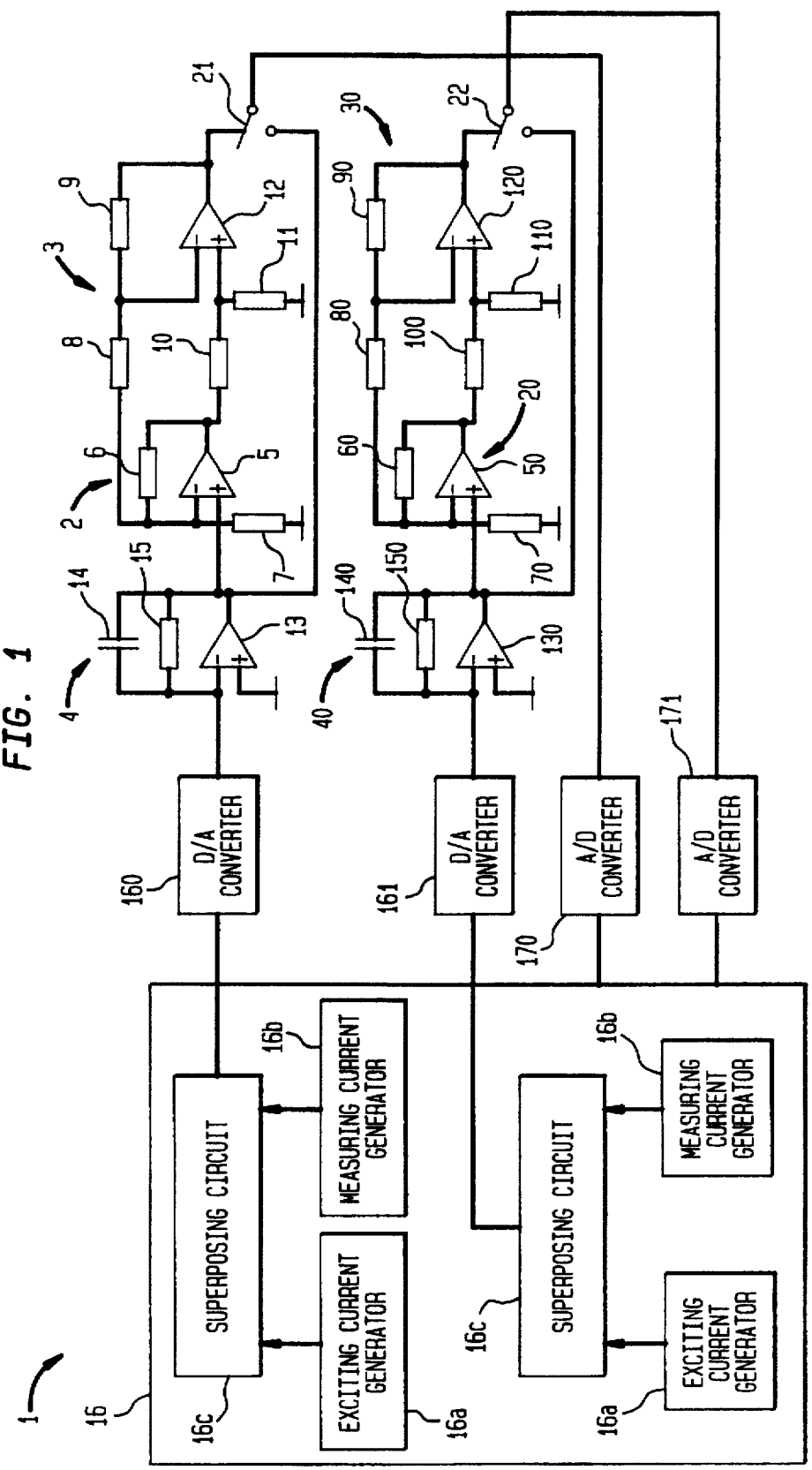

METHOD FOR DETERMINING A ROTOR POSITION OF A ROTARY MOTOR OR LINEAR MOTOR, AND CIRCUIT ARRANGEMENT FOR CARRYING OUT THE METHOD

BACKGROUND OF THE INVENTION

The invention relates to a method for determining the position of a rotor of a rotary engine or a linear motor, e.g. a stepper motor, a synchronous motor or the like, having at least two stator windings and a rotor with salient poles. The invention further relates to a circuit arrangement for carrying out the method.

A determination of the rotor position is generally carried out in those cases which make it impossible to determine the rotor position of a motor e.g. by a sensor that is placed on the Shaft, or which make it undesired to incorporate such a sensor. When operating e.g. a stepper motor in full cycle or half cycle, the rotor of the motor occupies precisely the position that matches the control pulses delivered to its stator winding even when this stepper motor is not controlled by a position-regulating circuitry. Precondition is however that the motor is not overloaded by the mechanical load, i.e. that the control pulses are strong enough to overcome the mechanical load of the motor.

Stepper motors can be operated in the so-called "microstep operation" through control of their stator windings with sinusoidal current. Typically, stepper motors activated in this manner operate accurately also without a closed loop i.e. without remeasurement and readjustment of the rotor position to match the desired position. However, if the stepper motor is subject to fluctuating or unknown loads, measures must be taken to determine, and possibly readjust the actual rotor position, which means that basically a closed loop control for the rotor position should be provided.

The publication 'IEEE Transactions on Industrial Electronics', Vol. 36, No 4, 1989 discloses a method for determining the rotor position of stepper motors based on measurement of the rise time of the exciting current. When controlling the stator windings of stepper motors with salient poles by applying a voltage, the rise time of the resulting exciting current depends on the rotor position. As the rise time is known for each rotor position, a comparison of these known values with the measuring result determines the actual rotor position. However, the comparison of the measured rise time with the known rise times necessitates a complicated circuitry, and moreover, this type of comparison prevents the application of an arithmetic operation because a sufficiently precise mathematical relationship cannot be established for describing the dependency of the rise time of the exciting current from the rotor position.

International publication WO 92/01331 discloses a method of and circuit arrangement for sensorless detecting the angle of rotation of a non-attenuated, preferably permanently excited, synchronous motor that is supplied by a current converter through use of measuring signals which are based on voltage jumps generated by the converter and transmitted to a processor for calculating the rotor position as a function of the stator reactance. The necessary measurements are executed by a measuring module which assumes the control of the machine control system and subsequently hand the control back to the control unit of the machine.

The determination of the rotor position in this manner is relatively complicated, rendering also the circuit arrangement very complex because e.g. two separate assembly units must be provided to effect the control and to execute the measurement of the rotor position.

SUMMARY OF THE INVENTION

It is an object of the present invention to provide an improved method for determining and controlling the position of a rotor, obviating the afore stated drawbacks.

In particular, it is an object of the present invention to provide an improved method for determining and controlling the position of a rotor, which is easy to carry out.

It is still a further object of the present invention to provide an improved circuit arrangement for determination of the rotor position and control of the rotor, which can be realized in a simple manner.

These objects and others, which will become apparent hereinafter, are attained in accordance with the present invention by superimposing the exciting current for the controlled stator winding with a periodic measuring current having a frequency that is greater than the operating frequency of the motor so as to be prevented from interfering with the excitation of the stator windings, and by measuring the reactive voltage drop caused by the measuring current across the stator winding for determining the inductance.

Through determining the inductance, the rotor position can be derived and thus readjusted to correspond to a desired value in a simple and easy way by suitably modifying the exciting current.

Preferably, the measuring current is triangular in order to facilitate the determination of the inductance of the controlled stator winding by means of a simple calculation.

A circuit arrangement for carrying out the method according to the present invention includes a signal processor containing a current generator supplying a measuring current to the stator winding, and a voltage drop detection circuit for measuring the reactive voltage drop across the stator winding, caused by the measuring current so that for each desired rotor position the inductance of the read out stator winding can be determined. Thus, the circuit arrangement according to the invention is of simple structure and easy to maintain.

According to a preferred embodiment of the present invention, the exciting current generators are formed by sinusoidal voltage generators and the measuring current generators are formed by rectangular voltage generators. Their outputs are respectively connected to the inputs of a superposing circuit by which the sinusoidal voltage is superimposed by the rectangular voltage. The output of the superposing circuit is connected to the input of an integrating circuit, the output of which is connected to the input of a voltage/current converter which has an output connected to one of the stator windings of the motors. Preferably, the voltage drop detection circuit includes a differential amplifier, with its two inputs connected to both ends of the respective stator winding and with its output connected to the input of a respective control circuit of the signal processor.

Both voltage signals can be generated at high quality through a simple circuitry, thereby effecting a precise read out of the stator windings and exact measurements of the reactive voltage drop.

According to a further feature of the present invention, the integrating circuit includes an operational amplifier having an output with feedback to its inverted input via a parallel circuit comprised of a resistor and a capacitor, and a non-inverted input which is grounded. Such an integrating circuit operates in all frequency ranges of the control signal for the read out stator winding.

According to another feature of the present invention, the differential amplifier is formed by an operational amplifier, the inverted input of which is fedback, on the one hand, to its output via a first resistor and, on the other hand, to one end of the stator winding via a second resistor, and the non-inverted input of which is, on the one hand, grounded via a third resistor and, on the other hand, connected to the other end of the stator winding via a fourth resistor. This enables to tap and process precisely the voltage that is actually applied on the stator winding.

Preferably, the voltage/current converter may be formed by an operational amplifier, the inverted input of which is, on the one hand, grounded via a resistor and, on the other hand, fedback to its output via the stator winding, and the non-inverted input of which forms the input of the voltage/current converter. A voltage/current converter of this type is easy to control and reliably operates even at a high measuring frequencies.

BRIEF DESCRIPTION OF THE DRAWING

The above and other objects, features and advantages of the present invention will now be described more in detail with reference to the accompanying drawing in which the sole FIG. 1 is a schematic illustration of an exemplified circuit arrangement in accordance to the invention for determining and controlling the position of a rotor of an exemplified stepper motor having two stator windings.

DETAILED DESCRIPTION OF A PREFERRED EMBODIMENT

Turning now to the drawings and in particular to FIG. 1, there is shown a schematic illustration of an exemplified circuit arrangement in accordance with the invention, generally designated by reference numeral 1 for determining and controlling the position of a rotor of an exemplified stepper motor having two stator windings 6, 60 and a rotor with salient poles. Persons skilled in the art will understand that the illustrated circuit arrangement is shown by way of example only and should not be limited application in a stepper motor, as this type of circuit arrangement is applicable to determine the rotor position of any type of motor with salient rotor poles, e.g. rotary motor, linear motor or synchronous motor or the like.

The circuit arrangement 1 includes a digital signal processor, generally designated by reference numeral 16 and including for each of the stator windings 6, 60 an exciting current generator 16a in form of a sinusoidal voltage generator and a measuring generator 16b in form of a rectangular voltage generator. The outputs of the generator 16a, 16b are connected to the inputs of a superposing circuit 16c which superimposes the sinusoidal voltage with the rectangular voltage. The output of the superposing circuit 16c is connected via a digital/analog converter 160; 161 to the input of an integrating circuit, generally designated by reference numeral 4; 40.

The integrating circuit 4, 40 includes an operational amplifier 13; 130, with its output fedback externally to its inverted input via a parallel circuit comprised of a resistor 15; 150 and a capacitor 14; 140, and with its non-inverted input being grounded. Such an integrating circuit 4; 40 does not alter the sinusoidal or cosinusoidal pattern of the voltage but merely causes a phase shift. However, the superimposed rectangular voltage is converted to a voltage with triangular pattern.

The output of the integrating circuit 4; 40 is connected to the input of a voltage/current converter, generally designated by reference numeral 2; 20, and including an operational amplifier 5; 50, the inverted input of which is, on the one hand, grounded via a resistor 7; 70, and, on the other hand, fedback to its output via the stator winding 6; 60. The non-inverted input of the operational amplifier; 50 forms the input of the voltage/current converter 2, 20. The voltage/current converter 2; 20 converts the control and measuring signals, as calculated and outputted by the signal processor 16, into corresponding currents for control of the winding.

Further connected to the read out winding 6; 60 is a voltage drop detection circuit, generally designated by reference numeral 3; 30 which includes a differential amplifier 12; 120, receiving a signal from the stator winding 6; 60 and delivers an output signal to the signal processor 16 via an analog/digital converter 170; 171. The differential amplifier 12; 120 is formed by an operational amplifier, the inverted input of which is fedback, on the one hand, to its output via a first resistor 9; 90 and, on the other hand, to one end of the read out stator winding 6; 60 via a second resistor 8, 80. The non-inverted input of the operational amplifier 12; 120 is grounded, on the one hand, via a third resistor 11, 110, and connected, on the other hand, to the other end of the stator winding 6; 60 via a fourth resistor 10; 100.

As none of the connections of the stator winding 6; 60 is applied to a defined and known potential, it is not possible to simply tap the potential across a winding connection and calculate therefrom the voltage applied across the stator winding 6; 60. Therefor, the circuit arrangement 1 requires the differential amplifier 12; 120 which yields an output voltage signal defined by the difference of the potentials across both winding connections.

A switch 21; 22 allows selective connection of the signal processor 16 with either the output of the voltage drop detection circuit 3, 30 or the output of the integrating circuit 4; 40. In this manner, the voltage generated by the integrating circuit 4, 40 can be checked and possible inaccuracies of the voltage applied on the stator winding and caused by structural tolerances can be taken into account upon calculation of the inductance of the stator winding.

After having described the components of the circuit arrangement according to the present invention, the method for determining and controlling the rotor position on the basis of a comparison of the actual value of the rotor position with a desired position and modification of the exciting current for readjusting the rotor into the desired position in dependence on the inductance measured across the stator windings 6; 60, will now be described in more detail.

When e.g. reading out the rotor position in a stepper motor by means of a closed loop, the actual rotor position is determined for comparison with the desired position and as a result of the comparison the rotor is readjusted to correspond to the desired position. In motors with salient rotor poles, the inductance of the stator windings 6; 60 is directly related to the rotor position so that the inductance can be utilized to determine the actual rotor position.

However, due to magnetic saturation, there is no linear correlation between the exciting current through the stator windings and the resulting magnetomotive force. This non-linear correlation has an adverse impact e.g. when a mechanical load increases two-fold and is responded with a doubling of the exciting current. In this case, the magnetomotive force is not doubled but increases only slightly by a too small value so that the increased mechanical load cannot be overcome. This non-linear correlation is defined by the current dependency of the relative permeability of the ferromagnetic circuit. However, the magnetomotive force as well as the inductance of a coil with iron core are linearly dependent on the relative permeability, as governed by the following equations, so that the non-linear relationship between the magnetomotive force and current can be negated through measurement of the inductance, and ensuing readjustment of the exciting current in response to the inductance measurement:

$$F=k1*\mu r*i$$

wherein k1 is a constant of the ferromagnetic circuit,

μr is relative permeability, i is Winding current,

F magnetomotive force $$L=k2*\mu r$$

wherein k2 is a constant of the coil

L inductance of the coil

If both material constants are known, the magnetomotive force can be determined after measurement of the inductance of the coil:

$$F=(k1*L*i)/k2$$

Through providing a closed loop control, the current through the coil can be modified such that the desired value of the magnetomotive force is always reached and previously described problems are eliminated.

As the inductance of a stator winding in motors with salient poles directly correlates to the rotor position, the determined inductance allows a conclusion about the rotor position.

The determination of the inductance is based in accordance with the present invention upon the measurement of the potential across the stator winding during current variation, as governed by the following equation:

$$u=L*(di/dt)$$

This equation can be simplified when di/dt is constant and known for each measurement. This is effected by a time-linear modification of the current, i.e. with a triangular pattern of the current. By selecting the amplitude and the frequency of the measuring current in a way that it will not contribute to the drive of the motor, then the measuring current can be utilized for superposing the exciting current of the stator windings which effects the drive of the motor. This condition is sufficiently met when the measuring current has e.g. a frequency which is greater by hundred fold and has a amplitude that is smaller by factor 100 with respect to the exciting current. It is important to satisfy these conditions because variations of the magnetomotive force of the stator caused by the periodic measuring current could lead to irregular movements which adversely affect determination of an exact rotor position.

The determination of the inductance of the stator windings 6; 60 is thus effected by superimposing the exciting current with a periodic measuring current having a frequency which exceeds the operating frequency of the motor so as to be prevented from interfering the excitation of the stator winding in any significant manner, and by measuring the reactive voltage drop caused by the measuring current across the stator winding for determining the inductance of the stator winding. This determination is based on a calculating step in accordance with above-stated equation. The calculation can be executed rapidly and with the necessary accuracy by simple processors.

The operation of the circuit arrangement according to the present invention is thus based on the following principle. A measuring current generator generates a measuring current which superimposes the exciting current, with both currents passing through the read out stator winding 6; 60. The measuring current causes a reactive voltage drop across the stator winding 6; 60 which is measured by a voltage drop detection circuit 3, 30 and directly correlates to the inductance of the stator winding 6; 60 so that each desired rotor position can be associated to an inductance for determining the actual rotor position.

While the invention has been illustrated and described as embodied in a method for determining a rotor position of a rotary motor or linear motor, and circuit arrangement for carrying out the method, it is not intended to be limited to the details shown since various modification and structural changes may be made without departing in any way from the spirit of the present invention.

What is claimed as new and desired to be protected by Letters Patent is set forth in the appended claims: I claim:

1. A method for determining a position of a rotor of a rotary motor or linear motor having at least two stator windings and a rotor with salient poles and operating at a first frequency, comprising the steps of:

superimposing an exciting current for the stator windings with a periodic measuring current having a second frequency exceeding the first frequency of the motor so as to be prevented from interfering with excitation of the stator windings, measuring a reactive voltage drop caused by the measuring current across the stator windings;

calculating on the basis of the measured voltage drop the inductance of the stator windings to provide an information about an actual rotor position;

comparing the actual rotor position with a desired rotor position; and adjusting the actual rotor position in response to a deviation of the actual rotor position from the desired rotor position by modifying the exciting current.

2. The method of claim 1, wherein the measuring current is triangular.

3. A circuit arrangement for determining a position of a rotor of a rotary motor or linear motor, comprising:

a stator having a winding, and a rotor movable relative to the stator and formed with salient poles;

a first generator for forming an exciting current at a first frequency to flow through the stator winding to effect a movement of the rotor;

a second generator forming a measuring current to flow through the stator winding, with the measuring current having a second frequency which exceeds the first frequency of the exciting current to cause a voltage drop across the stator winding without effecting the position of the rotor;

a voltage drop detection circuit for measuring the voltage drop across the stator winding;

a control circuit receiving a signal from the voltage drop detection circuit commensurate with the measured voltage drop and calculating the inductance on the basis of the measured voltage drop for determining the actual rotor position and comparing it with a desired rotor position, said control circuit being connected to the first generator to allow regulation of the exciting current in response to the calculated value of the inductance.

4. The circuit arrangement of claim 3, wherein the first generator is a sinusoidal voltage generator having an input and an output, and the second generator is a rectangular voltage generator having an input and an output, said circuit arrangement further comprising:

- a superimposing circuit having an input connected to the output of the first generator and an input connected to the output of the second generator for superimposing the sinusoidal voltage with the rectangular voltage;
- an integrating circuit connected to an output of the superimposing circuit for converting the measuring current of rectangular voltage into a triangular voltage; and
- a voltage/current converter connected to an output of the superimposing circuit and having an output connected to the stator winding;
- said voltage drop detection circuit including a differential amplifier being connected to both ends of the stator winding and having an output connected to the control unit.

5. The circuit arrangement of claim 4 wherein the integrating circuit includes an operational amplifier and a parallel circuit comprised of a resistor and a capacitor, said operational amplifier having an inverted input, a non-inverted input and an output, with the output being fedback via the parallel circuit to the inverted input, and with its non-inverted input being grounded.

6. The circuit arrangement of claim 4 wherein the differential amplifier is formed by an operational amplifier having an inverted input, a non inverted input and an output, said voltage drop detection circuit further including first, second, third and fourth resistors, with the inverted input of the operational amplifier being connected to the output of the operational amplifier via the first resistor and to one end of the stator winding via the second resistor, and with the non-inverted input of the operational amplifier being grounded via the third resistor and connected to the other end of the stator winding via the fourth resistor.

7. The circuit arrangement of claim 4, wherein the voltage/current converter includes an operational amplifier having an inverted input being grounded via a resistor, an output being fedback to the inverted input via the stator winding, and a non-inverted input forming the input of the voltage/current converter.

\* \* \* \* \*